Figure 1:
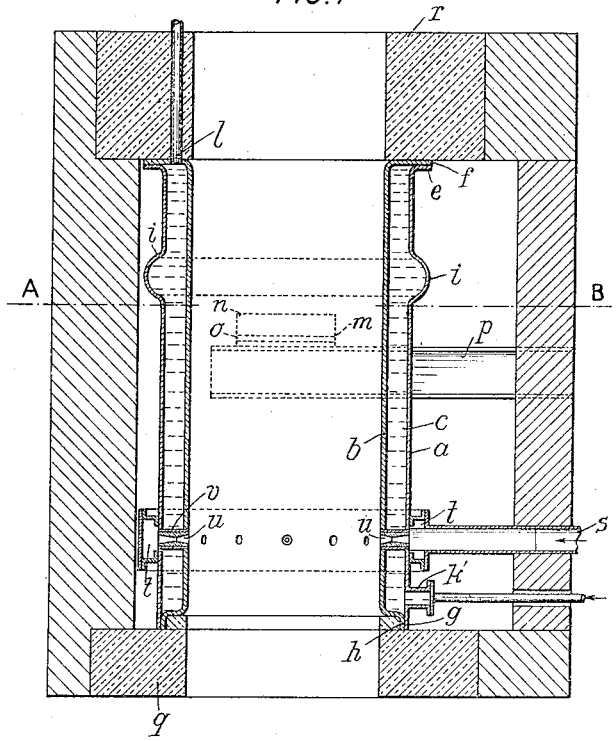

W. PIERNAY.
COOLING MANTLE FOR FURNACES.
APPLICATION FILED APR. 7, 1914.

1,262,250.

Patented Apr. 9, 1918.

WITNESSES

INVENTOR
WALTER PIERNAY
ATTORNEY

UNITED STATES PATENT OFFICE.

WALTER PIERNAY, OF STETTIN, GERMANY, ASSIGNOR TO STETTINER CHAMOTTE-FABRIK AKTIEN-GESELLSCHAFT VORMALS DIDIER, OF STETTIN, GERMANY.

COOLING-MANTLE FOR FURNACES.

1,262,250.

Specification of Letters Patent.    Patented Apr. 9, 1918.

Application filed April 7, 1914.  Serial No. 830,319.

*To all whom it may concern:*

Be it known that I, WALTER PIERNAY, engineer, subject of Germany, residing at No. 25 Saunierstrasse, in the city of Stettin, German Empire, have invented new and useful Improvements in Cooling-Mantles for Furnaces; and I do hereby declare the following to be a full, clear, and exact description of the same.

My invention relates to an improved cooling mantle or jacket for furnaces.

When a furnace is used for substances which produce strongly adhering slag, for example, for refuse of dustbins, etc., it is of advantage to provide the combustion chamber with a water jacket, in order to prevent the slag from adhering. If the combustion is carried on at high temperature, as is mostly the case, great difficulty has heretofore been encountered to keep the water jacket tight. For example, when the temperature in the combustion chamber is 1200° C. and more, and the water in the mantle is heated up to about 100°, the highly heated interior wall of the mantle will expand more than the relatively colder outside wall. As a consequence the connection between the inside and outside mantle soon became untight and the points of connection of the two walls could not heretofore withstand the irregular stresses and were accordingly destroyed.

According to my invention I overcome this drawback by providing a resilient member in the outside wall of the mantle. I prefer to provide the outside mantle with a rib extending around the entire circumference, but the desired possibility of extension of the outside wall can be obtained by any other resilient member. In consequence of the resilience given to the outside mantle the points of connection with the inside mantle can move when the inside mantle expands to a great extent, so that these points are entirely unloaded and remain tight. It is therefore possible to rivet the end connections of the mantle or to weld the same and thus to obtain a durable joint in the simplest manner.

In order to improve the result obtained by this invention I recommend leaving the cooling mantle quite free in the brickwork, because then the movements of the walls can take place better.

A further essential feature of my invention consists in providing the cooling mantle with brackets by which it rests on rails, so that, after loosening the pipes for feeding and leading off the water, the mantle can be easily drawn out of the brickwork.

Figure 2:
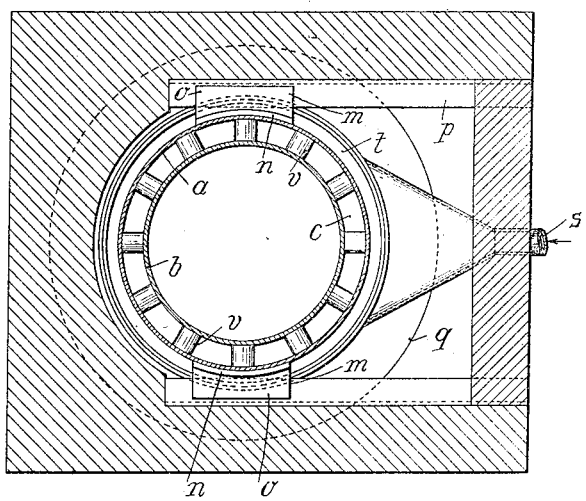

On the drawing the invention is shown by way of example,

Figure 1 being a longitudinal section through the combustion shaft,

Fig. 2 a cross section on the line A—B in Fig. 1.

In this example there is a cylindrical mantle, but the cooling mantle can have any other form adapted to the shape of the furnace chosen.

The outside wall $a$ and the inside wall $b$ of the cooling mantle $c$ are so led together at the upper and lower ends that two parallel annular flanges $e$, $f$ or $g$, $h$ are formed at each end. The flanges $e$, $f$ or $g$, $h$ can be screwed, riveted or welded together or jointed in any other way. In the upper part of the mantle the outside wall has an outwardly projecting rib $i$ which extends around the entire mantle. In the example shown this rib has a circular arc shape, but any other shape may be chosen. The cold water is fed in through the pipe $k$ at the lower end of the mantle and passes off through an opening $l$ at the highest point thereof. This is preferable in order to assure that the mantle $c$ is always perfectly full of water and contains neither air nor vapors.

Underneath the rib $i$ brackets $m$ are provided on the outside mantle $a$. Each bracket consists of a vertical part $n$ and of a horizontal part $o$. The vertical part $n$ of the bracket, which is curved and adapted to the shape of the mantle, is fastened to the mantle in suitable manner, for example by rivets. The horizontal parts $o$ of the brackets rest on rails $p$, which are fastened in the brickwork. It will be evident that the mantle is free for its entire length from brickwork and it stands on a chamotte base $q$, the hollow space of which is in communication with the combustion chamber. Over the cooling mantle there is a chamotte ring $r$ which does not weigh on the mantle.

The furnace is charged from the top. The slag and ashes formed during the combustion are removed from the chamber underneath the combustion chamber. The devices necessary for this purpose are not shown, because they do not belong to the invention and because experts are well acquainted with various methods of doing this.

The air necessary for burning the charge is led in through a pipe and passes into the annular chamber $t$, from which nozzles $u$ enter into the combustion chamber. Said nozzles are arranged in tubes $v$ of the cooling jacket.

What I claim and desire to secure by Letters Patent of the United States is:—

1. In a combustion furnace or the like, the combination of a removable double-wall cooling mantle; a brickwork surrounding the mantle and touching it only at its ends and otherwise leaving the entire length of the mantle free; and means for supporting the mantle while being removed from the brickwork.

2. In a combustion furnace or the like, the combination of a removable double-wall cooling mantle; a brickwork surrounding the mantle and touching it only at its ends and otherwise leaving the entire length of the mantle free, said brickwork provided with a removable portion; and means for supporting the mantle while being removed from the brickwork through the opening at the removable portion.

3. In a furnace, the combination of a brickwork comprising a base having an inner flange, and chamotte ring supported by the brickwork; a cooling mantle disposed free within the brickwork and comprising an inner wall having an outwardly turned upper flange and an outwardly and downwardly turned lower flange engaging over said inner flange of the ring, and an outer wall embracing said downwardly turned flange and having an outwardly turned upper flange resting against the upper flange of the inner wall and an intermediate annular corrugation; an outlet pipe for said mantle extending through said ring and the outwardly turned flange of the inner wall parallel to the axis of the mantle; brackets secured to an intermediate part of said outer wall; and rails in said brick and on which said brackets rest.

4. In combination with a double wall cooling mantle for combustion furnaces, a brickwork surrounding, leaving the entire length of said mantle free, brackets on said mantle, and rails fastened in said brickwork and carrying said brackets and mantle, substantially as set forth.

In testimony whereof, I have signed my name to this specification in the presence of two subscribing witnesses.

WALTER PIERNAY.

Witnesses:
GEORGE LILIEQUIST,
EMIL SCHMIDT.

Copies of this patent may be obtained for five cents each, by addressing the "Commissioner of Patents, Washington, D. C."